US012591461B2

(12) United States Patent
Kumar

(10) Patent No.: US 12,591,461 B2
(45) Date of Patent: Mar. 31, 2026

(54) ADAPTIVE SCHEDULING WITH DYNAMIC PARTITION-LOAD BALANCING FOR FAST PARTITION COMPILATION

(71) Applicant: Synopsys, Inc., Mountain View, CA (US)

(72) Inventor: Amit Kumar, Bangalore (IN)

(73) Assignee: Synopsys, Inc., Sunnyvale, CA (US)

( * ) Notice: Subject to any disclaimer, the term of this patent is extended or adjusted under 35 U.S.C. 154(b) by 840 days.

(21) Appl. No.: 17/410,517

(22) Filed: Aug. 24, 2021

(65) Prior Publication Data

US 2022/0066824 A1 Mar. 3, 2022

Related U.S. Application Data

(60) Provisional application No. 63/072,401, filed on Aug. 31, 2020.

(51) Int. Cl.
| | |
|---|---|
| *G06F 9/46* | (2006.01) |
| *G06F 9/48* | (2006.01) |
| *G06F 9/50* | (2006.01) |

(52) U.S. Cl.
CPC ............ *G06F 9/505* (2013.01); *G06F 9/4881* (2013.01); *G06F 9/5016* (2013.01)

(58) Field of Classification Search
CPC ...... G06F 9/505; G06F 9/4881; G06F 9/5016; G06F 9/5027; G06F 9/5038;
(Continued)

(56) References Cited

U.S. PATENT DOCUMENTS

| | | | | | |
|---|---|---|---|---|---|
| 5,555,201 | A | * | 9/1996 | Dangelo | ............... G06F 11/261 |
| | | | | | 714/E11.167 |
| 6,080,204 | A | | 6/2000 | Mendel | |

(Continued)

FOREIGN PATENT DOCUMENTS

| | | | | |
|---|---|---|---|---|
| CN | 101008963 | A | 8/2007 | |
| CN | 111353712 | A * | 6/2020 | ....... G06Q 10/06311 |
| IN | 201944041004 | A | 4/2020 | |

OTHER PUBLICATIONS

First Office Action for corresponding Chinese Patent Application No. 2021109973834, Sep. 15, 2025, 8 pages and English translation 12 pages.

*Primary Examiner* — April Y Blair
*Assistant Examiner* — Zhi Chen
(74) *Attorney, Agent, or Firm* — WOMBLE BOND DICKINSON (US) LLP

(57) ABSTRACT

Disclosed herein are method, system, and computer-readable storage-medium embodiments of adaptive scheduling with dynamic partition-load balancing for fast partition compilation. An embodiment includes detecting, by at least one processor, an available hardware-resource amount available to be used by an electronic design automation (EDA) process via a plurality of computing elements, with respect to a design specification, and analyzing the design specification, to generate an estimate of a hardware-resource amount to be used by the EDA process. In some further embodiments the at least one processor may compare the estimate with the available hardware-resource amount, and adjust at least one of a memory allocation for the EDA process or a specified number of computing elements of the plurality of computing elements, for parallel use by the EDA process. Moreover, the at least one processor may calculate a weighted load average for the plurality of computing elements, according to some additional embodiments.

20 Claims, 13 Drawing Sheets

(58) Field of Classification Search
CPC .... G06F 9/5044; G06F 9/5066; G06F 9/5077;
G06F 9/5083
See application file for complete search history.

(56)                References Cited

U.S. PATENT DOCUMENTS

| 6,116,083 | A | * | 9/2000 | Cullen | F02D 41/0072 |
| | | | | | 73/114.74 |
| 6,205,441 | B1 | * | 3/2001 | Al-omari | G06F 16/24537 |
| | | | | | 707/999.005 |
| 7,316,011 | B1 | * | 1/2008 | Rajaram | G06F 8/4434 |
| | | | | | 717/157 |
| 7,509,244 | B1 | * | 3/2009 | Shakeri | G06F 8/41 |
| | | | | | 717/109 |
| 9,552,561 | B2 | * | 1/2017 | Cantor | G06Q 10/063114 |
| 9,646,118 | B1 | * | 5/2017 | Klair | G06F 30/3308 |
| 11,200,038 | B1 | * | 12/2021 | Hoffman | G06F 8/447 |
| 2002/0078125 | A1 | * | 6/2002 | Ichinose | G06F 9/5066 |
| | | | | | 718/107 |
| 2003/0204669 | A1 | * | 10/2003 | Ranganathan | G06F 13/1636 |
| | | | | | 711/167 |
| 2010/0299646 | A1 | * | 11/2010 | Pierrat | H01L 21/3086 |
| | | | | | 703/2 |
| 2010/0303022 | A1 | * | 12/2010 | Maas | H04L 5/0037 |
| | | | | | 370/329 |
| 2011/0078477 | A1 | * | 3/2011 | Park | G06F 1/3296 |
| | | | | | 713/323 |
| 2013/0325763 | A1 | * | 12/2013 | Cantor | G06Q 10/06312 |
| | | | | | 706/12 |
| 2014/0089873 | A1 | * | 3/2014 | Bures | G06F 30/33 |
| | | | | | 716/107 |
| 2016/0072613 | A1 | * | 3/2016 | Esserman | H04W 72/51 |
| | | | | | 370/230 |
| 2016/0085477 | A1 | * | 3/2016 | Mirza | G06F 3/0611 |
| | | | | | 711/165 |
| 2018/0307998 | A1 | * | 10/2018 | Strachan | G06N 7/01 |
| 2019/0114202 | A1 | * | 4/2019 | Wang | G06F 9/5044 |
| 2020/0042362 | A1 | * | 2/2020 | Cui | G06N 3/0985 |
| 2020/0174844 | A1 | * | 6/2020 | Bergsma | G06F 9/5077 |
| 2021/0096915 | A1 | * | 4/2021 | Patel | G06F 9/4887 |

* cited by examiner

100

200

| Activity | Real(s) | User(s) | Sys(s) | Virt(MB) | Res(MB) | Shr(MB) | Priv(MB) | nFLT | CPU |
|---|---|---|---|---|---|---|---|---|---|
| Global_analysis | 0.75 | 0.15 | 0.12 | 312.2 | 78.3 | 3.7 | 74.5 | 53 | 1 |
| _Partition:_intf_repository | 1.85 | 0.35 | 0.87 | 300.9 | 97.1 | 59.2 | 37.9 | 33 | 4 |
| _Partition:_pc_package_j6TXnc | 1.85 | 0.35 | 0.92 | 300.7 | 93.9 | 46.0 | 47.8 | 2 | 2 |
| _Partition:_top_VLvRtc | 3.93 | 0.81 | 2.53 | 317.7 | 116.0 | 49.3 | 66.7 | 6 | 1 |
| _Partition:BASE_54eNvc | 15.49 | 9.94 | 3.74 | 352.1 | 166.6 | 3.3 | 163.3 | 10 | 3 |
| All_partition_time | 15.51 | 11.48 | 8.09 | 1271.4 | 338.7 | 59.2 | 315.8 | 0 | X |
| Stitching_&_Elaboration | 1.93 | 0.56 | 0.42 | 257.9 | 75.6 | 2.7 | 73.0 | 0 | 1 |
| Total_time | 20.00 | 12.77 | 9.44 | / | / | / | / | / | X |

FIG. 2

Normalized time taken
with different values of jN
1.2
1.0
0.8
0.6
0.4
0.2
0.0
Design A    Design B    Design C    Design D
⊠fastpartcomp= j2    ⊠fastpartcomp=j4    □fastpartcomp=jN
FIG. 3

400

Learn

Scratch Compile
- Start with basic estimate based on partition content

Incremental Compile
- Look at previous runs to estimate memory profiles for each partition

Monitor

External Monitoring
- Keep monitoring machine load and other processes' memory

Internal Monitoring
- Keep monitoring actual partition memory usage wrt/initial estimates, update the estimates for remaining partitions if difference is large

Balance

Find available number of CPUs at each scheduling cycle (external+internal load)

Spawn jobs until estimated memory breaches system memory limits

Keep performing compilation for at least one partition

```
Mon Nov 18 10:29:40 2019: Going for full parallel capacity (24)
Mon Nov 18 10:29:40 2019: Free Mem =280,186,617,856, this_mem=1,882,988,544 , mem_
Mon Nov 18 10:29:40 2019: Launching verilog job /netbatch/tmpwxwkn2/libvcspc_partition_A
Mon Nov 18 10:29:40 2019: Job status -- Running/Pending/Completed/Total 8/86/1/94
Mon Nov 18 10:29:40 2019: Free Mem =280,173,232,128, this_mem=1,891,946,496 , mem_
Mon Nov 18 10:29:40 2019: Launching verilog job /netbatch/tmpwxwkn2/libvcspc_partition_B
Mon Nov 18 10:29:40 2019: Job status -- Running/Pending/Completed/Total 9/85/1/94
Mon Nov 18 10:29:40 2019: Free Mem =280,151,162,880, this_mem=1,910,145,024 , mem_
Mon Nov 18 10:29:40 2019: Launching verilog job /netbatch/tmpwxwkn2/libvcspc_partition_C
Mon Nov 18 10:29:40 2019: Job status -- Running/Pending/Completed/Total 10/84/1/94
Mon Nov 18 10:29:40 2019: Free Mem =280,131,039,232, this_mem=1,919,938,560 , mem_
```

FIG. 7

Task Map
%Partitions (y-axis)
Time (x-axis)
•••••• Running ——— Completed
FIG. 8

900

1000

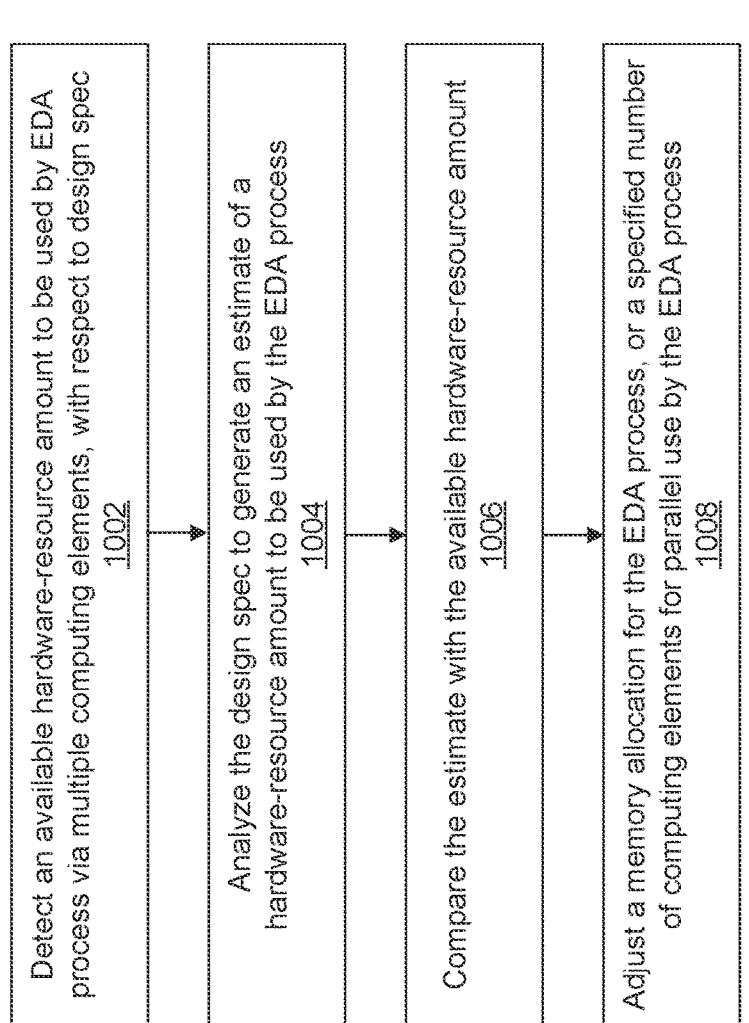

Detect an available hardware-resource amount to be used by EDA process via multiple computing elements, with respect to design spec
1002

Analyze the design spec to generate an estimate of a hardware-resource amount to be used by the EDA process
1004

Compare the estimate with the available hardware-resource amount
1006

Adjust a memory allocation for the EDA process, or a specified number of computing elements for parallel use by the EDA process
1008

ADAPTIVE SCHEDULING WITH DYNAMIC PARTITION-LOAD BALANCING FOR FAST PARTITION COMPILATION

CROSS-REFERENCE TO RELATED APPLICATIONS

The present application claims the benefit of U.S. Provisional Patent Application No. 63/072,401, titled "Adaptive Scheduling with Dynamic Load Balancing for Fast Partition Compilation," filed on Aug. 31, 2020, which is incorporated by reference in its entirety for all purposes.

TECHNICAL FIELD

The present disclosure relates generally to improving performance of electronic design automation (EDA) tools. More specifically, the present disclosure relates to improving efficiency and speed of partition compilation from design specifications.

BACKGROUND

Modern EDA tools may allow for compilation of hardware design specifications or descriptions (e.g., from higher-level hardware-description languages) using multiple partitions. Although the use of multiple partitions may allow tools to manage complexity and parallelize workloads, the resultant resource usage and performance overall can often be suboptimal nonetheless for designs that may be relatively large and especially complex.

As a result, attempts to parallelize the workloads, even using distributed cloud-based systems, may result in inefficient usage of computing resources, adversely affecting other processes using the same pool of computing resources. Such effects may include slowdowns of overall compilation times or even deadlocks that may stall the compilation processes. However, it is often not apparent to users of the tools how to allocate computing resources to complex compilation jobs to improve the efficiency and speed of compilation.

Users' attempts to improve performance by changing compilation parameters may affect performance metrics at random, or may result in further slowdowns, consequently worsening performance further. Conventional automation techniques similarly lack sufficient sophistication, and they tend to yield similar problematic results.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 2 depicts an example of a report showing fast partition-compilation results, according to some embodiments of the present disclosure.

FIG. 3 depicts results of experiments using three different settings of parallelism for an implementation of fast partition compilation applied to four different designs, according to some embodiments of the present disclosure.

FIG. 4 depicts an example design flow including considerations of dynamic partition-load balancing together with adaptive scheduling for partition compilation, according to some embodiments of the present disclosure.

FIG. 5 depicts example output messages logged from a dynamic partition-load balancing process, according to some embodiments of the present disclosure.

FIG. 7 depicts memory usage over the course of compiling multiple partitions as a result of an experiment using adaptive scheduling and memory allocation with dynamic partition-load balancing for fast partition compilation, according to some embodiments of the present disclosure.

FIG. 8 depicts running tasks and completed tasks over time as a result of a subsequent iteration of an experiment using adaptive scheduling and memory allocation with dynamic partition-load balancing for fast partition compilation, according to some embodiments of the present disclosure.

FIG. 10 depicts a flowchart illustrating a method implementing some of the enhanced techniques described herein, according to some embodiments of the present disclosure.

In the drawings, like reference numbers generally indicate identical or similar elements. Additionally, the left-most digit(s) of a reference number may generally also identify the drawing in which the reference number first appears.

DETAILED DESCRIPTION

Aspects of the present disclosure relate to adaptive scheduling with fast partition compilation. Further aspects of the present disclosure relate to dynamic partition-load balancing for fast partition compilation.

As noted above, hardware design specifications or descriptions may be split into multiple parts to be compiled separately. The multiple parts of the hardware design specifications or descriptions can be referred to as multiple partitions. The use of multiple partitions may allow EDA tools to manage complexity and parallelize workloads. When conventional EDA tools are used to manage complexity and parallelize workloads, the resultant resource usage and performance overall may be problematic for designs that may be relatively large and especially complex. Moreover, in the presence of time constraints and/or resource constraints, certain compilations for large or complex designs may not be completed in a timely manner, stalling progress and delaying project delivery.

Aspects of the present disclosure may be used separately or in combination with each other to address such problems, increasing parallelism and speed of operations, intelligently, responsive to a target design for compilation, elaboration, simulation, testing, or the like. Additionally, or alternatively, aspects of the present disclosure may be implemented responsive to parameters of design specifications and underlying host machines that run the above operations. The target design may be split into multiple partitions for compilation. Computing resources may be dynamically balanced to compile the multiple partitions to reduce the total compilation time of the multiple partitions and achieve fast partition compilation. For example, where possible, assigning more CPU cores may scalably improve performance for compiling multiple partitions, at least until the number of assigned cores matches the number of partitions to be compiled, according to some embodiments.

Each of these aspects, and other aspects, of the present disclosure, bring about technical advantages of enabling organizations and users to use available hardware resources efficiently while avoiding or mitigating effects of potential overloading or underutilization of the underlying host machines, for example. Other technical advantages are also apparent from the description and drawings throughout this disclosure.

Figure 1:
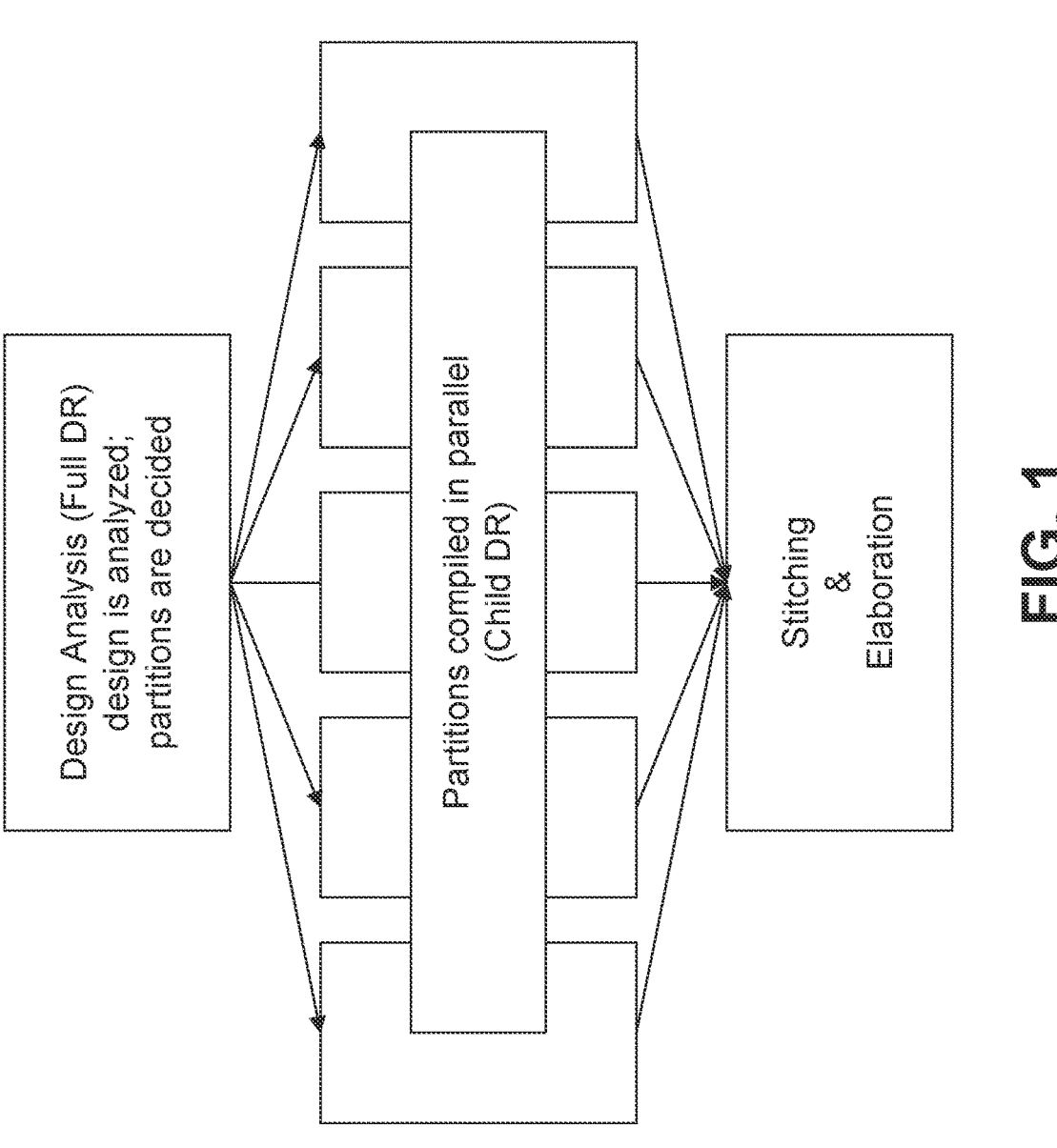
FIG. 1 depicts an example of a how designs may be split into multiple parts to be compiled separately, stitching the multiple results back together before or during an elaboration process, according to some embodiments of the present disclosure.

FIG. 1 depicts an example diagram 100 of how designs may be split into multiple parts to be compiled separately, stitching the multiple results back together before or during an elaboration process, according to some embodiments of the present disclosure. Though compilation may be performed serially, in some cases by default, other configurations may allow various jobs to be executed (also referred to as "fired") in parallel using a flag such as –fastpartcomp=j<X> where <X> represents a number of parallel processes to spawn, e.g., using a system call. In the fast partition completion with the flag of fastpartcomp, a number of X parallel processes may be assigned to the flag of fastpartcomp to compile the multiple partitions. In this way, overall compilation time may be reduced when a full design is analyzed ("full design resolution") and separate partitions are compiled in parallel ("child design resolution"). In the full design resolution, the entire hardware design specification or description may be analyzed to identify and create multiple partitions. In the child design resolution, the multiple partitions of the hardware design specification or description may be loaded in memory for compilation in parallel. After the full design is split into multiple partitions and each partition is compiled, compilation results for the multiple partitions may be stitched together at a stitching phase to create a composite set of shared libraries and simulation binary files for the entire hardware design specification or description, before or during subsequent elaboration step(s), as shown in diagram 100 of FIG. 1, according to some embodiments.

Performance may not significantly benefit from having a relatively small value of parallel processes (i.e., a small <X> parameter (argument) in the flag of fastpartcomp as described above). On the other hand, a large value may overload a host system. If a user is blindly checking out a workstation, cluster machine build cluster, remote or cloud-based virtual machine (VM), etc., it may not be easy or possible for the user to determine an efficient value of parallel processes corresponding to an improved number of computing elements to handle parallel processing of jobs.

This unknown value may be resolved by EDA tools applying enhanced techniques of auto-detecting system parameters, considering the current machine loads, and factoring in specific system requirements for a given target design, in order to determine improved parameters so that compilation spawns as many child partition processes as the machine can handle (but not significantly more), given the current load and configuration of the target build system(s). The system parameters auto-detected by the EDA tools may include hardware resources (including physical or virtual machine resources) and may additionally account for resources reserved for other processes, threads, jobs, tasks, etc., running on the same hardware resources.

This configuration may be useful even for dedicated machines where partition compilation may automatically be allocated to a majority of the cores available, instead of limiting partition compilation to a user-specific pessimistic value.

In some embodiments, the user may not specify the value of parallel processes for the fast partition complication. The user can assign a letter "N" for the flag of fastpartcomp, or –fastpartcomp=jN, where "N" is literally N (the fourteenth letter of the alphabet) to indicate that no value is specified, by way of non-limiting example. Upon this flag being processed, an adaptive scheduler may be invoked. Additionally, or alternatively, in some embodiments, the adaptive scheduler may be set by a separate flag, configuration mode, or environment variable (e.g., an exemplary invocation such as –partcomp=adaptive_sched—the adaptive scheduler may be invoked for the fast partition compilation with the flag of partcomp with a value of adaptive_sched).

For the adaptive scheduler to determine which number of parallel processes to spawn, the adaptive scheduler may factor in a machine load (e.g., scaled by a number of CPU cores available, described in additional detail further below) and a value specified for concurrent code generation (e.g., using a flag such as –jM to specify a value of M threads used by a child partition for concurrent code generation or partition complication, described in additional detail further below).

Machine Load and Availability of CPUs (Computing Elements)

In some embodiments, load is a measurement of the computational engagement of the machine, for example, the amount of computational work or processes executed by the machine. Load may be represented as a number where 0 is idle and 1 is 100% occupied. Load may also measure the amount of computational work or processes waiting for the machine and other system resources to execute the computational work or processes.

For example, a load of 5 may mean that 5 processes are waiting for the machine and other system resources to execute the 5 processes. For a single-CPU machine, a load of 1 implies that the CPU is fully occupied, with no idle time. However, for a machine having a number of N CPU cores, the full-occupation number becomes equal to N. Thus, while a load of 1 on a single-CPU machine may indicate that it is fully occupied, a load of 1 on a dual-CPU (or dual-core) machine may mean that machine is 50% occupied.

A use may need to know a current system's CPU load information to allocate computing resources for the partition compilation. The user can query the CPU load information with an uptime command. The query result or the uptime command may show a current system's CPU load average. A sample output is 21:18:09 up 107 days, 23:52, 650 users, load average: 3.12, 4.31, 4.11. The load average shown at the end of the uptime output above is represented as three numbers: one-minute average, five-minute average, and fifteen-minute average. In this case, where this machine has twenty computing elements, e.g., CPU cores (nproc), load averages of 3-4 imply that this machine is relatively free.

Using the outputs of nproc and uptime, it is further possible to apply a heuristic, for example, to find an efficient value of N. In one embodiment, a weighted average of the three loads may be used, with most weight given to the one-minute average and least weight given to the fifteen-minute average, according to some embodiments.

An example heuristic applied to calculate N1 (N based upon machine load) may be the following: $N_1 = N_{PROC} - (X*LoadAverage_{15} + Y*LoadAverage_5 + Z*LoadAverage_1) / (X+Y+Z)$, where $N_{PROC}$ is a number of computing elements (e.g., CPU cores) in the machine, $LoadAverage_{15}$ is fifteen-minute load average of the machine, $LoadAverage_5$ is five-minute load average of the machine, $LoadAverage_1$ is one-minute load average of the machine, and X, Y, and Z are numbers indicating weights for respective load averages. In one example, X may be 1, Y may be 2, and Z may be 3 for the weighted load averages.

Once $N_1$ is obtained, the value of parallel or concurrent code generation flag may then be checked. If the value of thread used by a child partition for concurrent code generation or partition complication has been provided, for example, the value of M for –jM has been provided, then $N_1$ is divided by M to find an actual CPU count, because child partitions may use M threads for code generation (compilation).

Reporting Changes

When an adaptive scheduler is invoked, or –fastpartcomp=jN is used, the following message may be displayed to the user at the fast partition compilation process: "After analyzing machine load and available computing resources, fastpartcomp has been set to –fastpartcomp=j5" for example. The message may notify the use that five parallel processes may be used for the fast partition complication after analyzing the machine load and available computing resources.

FIG. 2 depicts an example of a report 200 showing fast partition-compilation results, according to some embodiments of the present disclosure. When adaptive fastpartcomp is used, an additional column containing the CPU on which the job was executed may be also be shown in an output report (right-most column shown in FIG. 2). In this way, a user may see how different jobs were scheduled. An example report with fastpartcomp is shown in FIG. 2.

Even though this report may not display an exact processor definition (e.g., actual number of processors assigned to the fast partition compilation process, also referred to as "affinity," may change during process execution), such a report may give indicative information of processors used by the fast partition compilation process. Other reporting mechanisms may be reconfigured for similar outputs in this way.

Adaptive Scheduling Performance Results

FIG. 3 depicts results 300 of experiments using three different settings of parallelism for an implementation of fast partition compilation applied to four different designs, according to some embodiments of the present disclosure. As a performance test, several benchmarks that have multiple partitions have been used to qualify this change (e.g., automatic selection of a value for N). Running each benchmark three times, each time with different parallelism settings (for example, j2, j4, and jN, where j2 means two parallel processes are used for the fast partition compilation, j4 means two parallel processes are used for the fast partition compilation, and jN means an adaptive scheduler is invoked and a dynamic number of parallel processes are used for the fast partition compilation), differences in performance may be seen, as shown in FIG. 3.

In these experiments, jobs may be executed on remote machines with a command, such as using a command qrsh to execute the jobs on randomly selected machines at a load-sharing facility (LSF), in order to have a wide range of machines. The LSF distributes work across existing computing system resources to create a shared, scalable, and fault-tolerant infrastructure that delivers faster, more reliable workload performance and reduces cost. The adaptive load scheduler (jN) consistently gave faster results, even when the machine was loaded (as seen even with "Design D" at the far right of FIG. 3). The number of parallel processes spawned by jN is shown by the right-hand bar in each bar graph corresponding to each of Designs A through D, respectively.

An optional next step may include addition of a dynamic partition-load balancer (DPB), which may have an effect of actively reducing or increasing the number of parallel invocations in place at runtime for a job, on the fly. This aspect may further factor in a dimension of memory consumption, so that host machines may invoke reasonably sized partitions, at least in low-memory situations when the free memory on a machine is relatively constrained with respect to a given workload for a particular design under test, or for a total workload running on the given machine.

Dynamic Partition-Load Balancing

FIG. 4 depicts an example design flow 400 including considerations of dynamic partition-load balancing together with adaptive scheduling for partition compilation, according to some embodiments of the present disclosure. As described above, adaptive scheduling for fast partition compilation may speed up the compile time, but may potentially impact peak memory negatively, as multiple partitions may peak simultaneously, for example, causing the machine memory usage to climb to undesirably high levels in some use cases.

Dynamic partition-load balancing may avoid, mitigate, or resolve this potential problem, such as by using a learn-monitor-balance approach, in some embodiments. An example flow of considerations for DPB implementation is depicted in FIG. 4.

As with the adaptive scheduler, the dynamic partition-load balancer may be invoked using a flag such as –partcomp=dpb, where the flag of partcomp is assigned with dpb to invoke a dynamic partition-load balancer. Additionally, the DPB may be invoked in debug mode, where it may print scheduling decisions or other information, e.g., by specifying an additional sub-flag such as –partcomp=dpb: dbg, where a sub flag of dbg can invoke the debug mode of the dynamic partition-load balancer.

The DPB may follow various flows, such as a scratch flow and an incremental flow, to favor different decisions being taken. For example, in the scratch flow, partition compilation of first several sets of jobs may be executed. Conservative computing resources (e.g., up to one-third of the available CPUs being used) may be used to execute the first several sets of jobs or partitions. In the incremental flow following the scratch flow, the memory usage data of each partition during the partition compilation in the scratch flow is already available. This data may be a reasonable starting assumption of peak memory that the partition may take during recompilation. In the incremental flow, the steps followed to reach this decision may be performed, in an embodiment, as follows:

Step 1: DPB may study the memory usage data of each partition during the partition compilation in the scratch flow before full design resolution is invoked.

Step 2: After full design resolution has run, instead of generating scripts or configurations to build rules for partition compilation of each partition, or processing makefiles for partition compilation, execution may be passed on to the DPB.

Step 3: DPB may capture partitions to be recompiled.

Step 4. DPB may calculate a number of cores for the DPB to use (e.g., according to an adaptive scheduler or similar adaptive-scheduling algorithm).

Step 5: DPB may spawn partitions one-by-one or in parallel, but may wait until either of the following conditions are met:

Condition A: The number of CPUs used is less than number of cores available; or

Condition B: Anticipated memory consumption is less than available memory.

Available memory may be calculated using the following:

$$M_{avail} = \{M_{sysfree} - (M_{anticipated} - M_{actual})\} * C_{elastic},$$
where $M_{avail}$ = available target memory $M_{sysfree}$ = system free memory $M_{anticipated}$ = anticipated memory of already spawned jobs (using scratch data)

$M_{actual}$ = actual memory of already spawned jobs $C_{elastic}$ = a parameter determined dynamically based on the current machine configuration that may be adjusted to allow for headroom of idle CPU on a machine, which may be elastic across machines but constant for one specific machine specification (based on memory and swap space available), or a combination of the above factors, among other considerations. For example, $C_{elastic}$ may have a default value of 0.95.

Thus, for a job that is about to be executed, its anticipated memory usage may be less than available memory (e.g., if insufficient memory is expected, then the job may not be executed).

Condition C: If the job that is to be executed take too much computing resources (e.g., load), and cannot be spawned, the DPB may attempt to spawn the next job from among the pending jobs that takes less computing resources than the job presently determined to take too much computing resources at the moment of attempted spawning.

Condition D: If no job could be fired, and there are no running jobs now or in the next predicted cycle(s), the DPB may fire the job taking the least computing resources, to keep at least one job running, avoiding idle time. This way, the worst-case scenario for compile-time performance with DPB may not be worse than a single-threaded compilation in series.

Using the above steps and conditions for DPB, the following results may be seen:

the maximum number of available CPUs may be used;

more memory may be safely consumed from the machine; and/or throughput may be increased for any machine.

This may be referred to as a Learn-Monitor-Balance approach, in which

DPB may learn the partition memory usage from scratch compile,

DPB may keep tabs on how already-spawned partitions are doing, thus tracking any differences that may increase between scratch and incremental numbers, and DPB may adjust $C_{elastic}$ and take over from make, to continue balancing between load and memory on a given machine.

In a scratch flow, the steps may remain same as the incremental memory, other than that the "anticipated memory" values may be missing or omitted, because historical information may be unavailable. In this case the, the first several sets of jobs may be fired conservatively, e.g., with up to one-third of the available CPUs being used.

As soon as any one job completes, DPB may check its partition weight (e.g., computing resources required to execute the partition) and the actual partition memory usage and heuristically update the estimated memory usage for other pending partitions to reduce the difference between the actual and estimated memory usage. After doing this, the jobs may be processed in a less-conservative "full mode," in which most or all available CPUs may be used.

Each finished partition may return to DPB and the estimated and actual memory usage may be tallied. If the estimated and actual memory usage are too far apart, the estimates are recalculated using the knowledge gained from all completed partitions. In this manner, DPB may automatically adapt (e.g., by self-learning) to become smarter or otherwise more effective as it proceeds, based on input designs as well as based on available hardware and machine load. Additional details of these processes are described further elsewhere herein.

Reports and Debug

FIG. 5 depicts example output messages 500 logged from a dynamic partition-load balancing process, according to some embodiments of the present disclosure. A reporting mechanism may be integrated with the partition compilation that includes adaptive scheduling, dynamic partition-load balancing, or any combination thereof.

When such messages are output, any such messages may be stored in a log file, e.g., creating or appending to a file named "dpb.log" or any other suitable name. The output messages may print any step of the scheduling with time-stamp(s) similar to those of regrun output messages, for example. A sample output is shown in FIG. 5, for at least three different partitions named partition_A, partition_B, and partition_C, in an embodiment.

DPB Performance Results

Figure 6:
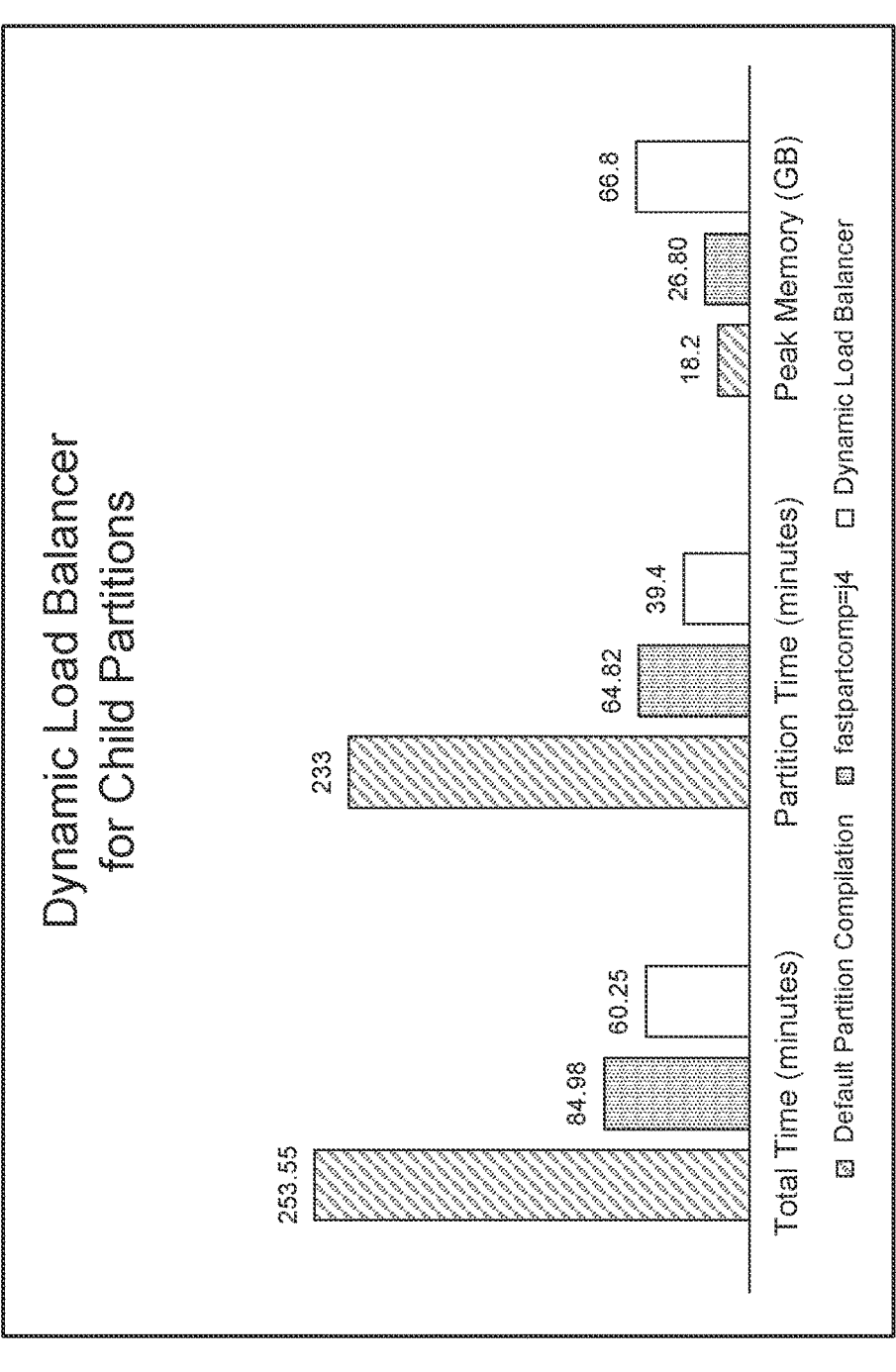
FIG. 6 depicts results of experiments measuring peak memory consumption and time using different methods of partition compilation, including a configuration of fast partition compilation, according to some embodiments of the present disclosure.

FIG. 6 depicts results 600 of experiments measuring peak memory consumption and time using different methods of partition compilation, including a configuration of fast partition compilation, according to an embodiment of the present disclosure. Observations from results are as follows: DPB improved the total compile time (CT) and partition CT by 30%, reducing each CT metric by approximately 25 minutes.

The DPB algorithm as described herein has been tested using experimental benchmarks and with practical scenarios. For experimental benchmarks, the DPB has empirically reduced compile time, with no increase in peak memory. In a given scenario having 94 partitions, a compilation job was fired on a randomly selected machine from a given server farm (e.g., build cluster). The results obtained are shown in FIG. 6.

FIG. 7 depicts memory usage over the course of compiling multiple partitions as a result of an experiment using adaptive scheduling and memory allocation with dynamic partition-load balancing for fast partition compilation, according to some embodiments of the present disclosure. Memory consumption of DPB was higher in this particular use case, running at an LSF on a shared machine having 100

GB of memory provisioned for the particular tests of partition compilation described in this example.

Comparing these tests, the results show that DPB has worked as expected by increasing the number of CPUs, increasing the memory taken, yet not overloading the system. The memory usage for the use pattern of this particular embodiment is shown here in FIG. 7, with DPB having used no more than 90% of the available memory as the number of finished partitions increased over the course of compiling the multiple partitions.

FIG. 8 depicts running tasks and completed tasks over time as a result 800 of a subsequent iteration of an experiment using adaptive scheduling and memory allocation with dynamic partition-load balancing for fast partition compilation, according to some embodiments of the present disclosure.

In the example shown in FIG. 8, tasks were fired conservatively, starting with eight parallel CPUs being used initially. As DPB improved its guesstimates for compiler load with respect to design complexity, DPB increased the number parallel CPUs to 24 for this use case, in accordance with the algorithms and techniques described herein.

In this particular instance, at a time when only relatively larger partitions were left to process, concurrent CPU usage decreased. As shown in FIG. 8, 90% of partitions were completed in 20% of total run time.

Additional considerations for DPB include use cases in which there may be a relatively long-running (time-consuming) partition, identified by having a higher proportional value of an estimate of a hardware-resource amount to be used, and for that portion to be scheduled at the beginning rather than at the end of a set of j obs. If such long-running job(s) may be scheduled starting at or near the beginning of the partition-compilation process (prioritizing the identified job ahead of the other jobs), overall performance with DPB and/or adaptive scheduling may thus yield further gains.

Additionally, other values may be chosen to improve the correlation of weighting with memory. To schedule long-running partitions earlier (prioritized ahead of other jobs), even if they demand more memory, may consider a dimension of compile time for metrics and heuristics, for example. This aspect may also yield further improved returns.

Figure 9:
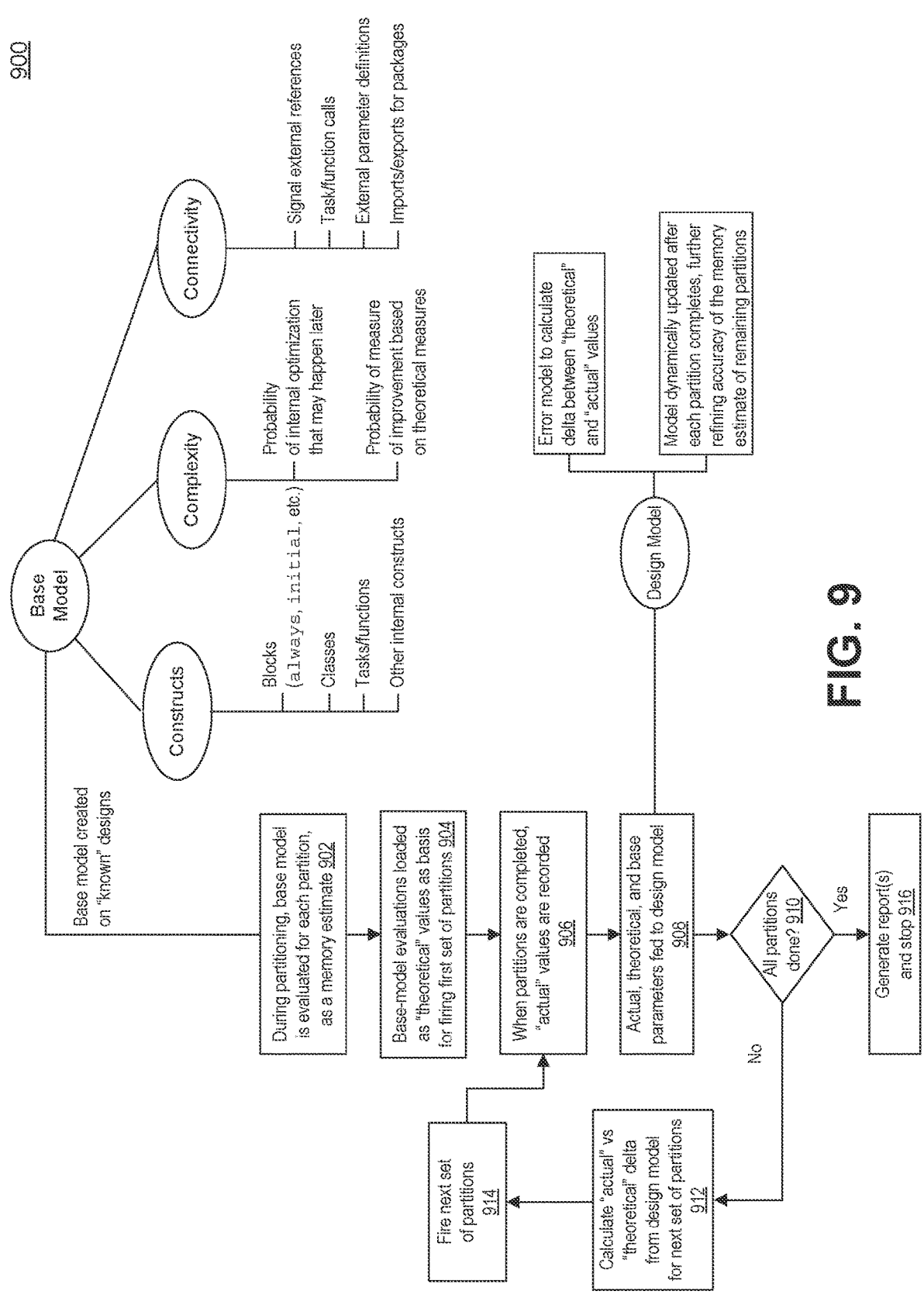
FIG. 9 depicts a flowchart and corresponding conceptual diagram of an example partition-compilation process and set of corresponding models therefor, according to some embodiments of the present disclosure.

FIG. 9 depicts a flowchart within a corresponding conceptual diagram 900 of an example partition-compilation process and set of corresponding models therefor, according to some embodiments of the present disclosure. A base model may be created with initial features or elements to be applied to any other designs as a start point to refine further heuristics. A design model may be built with specific features based on estimations provided by the base model. The conceptual diagram 900 illustrates a relationship between a design model and a base model via the flowchart, also mapping sub-elements of base-model elements including constructs, complexity, and connectivity, as a non-exhaustive sampling of other possible elements of the base model.

Examples of constructs include numbers and/or sizes of the following: blocks (e.g., syntactic elements such as always and/or initial in HDLs such as Verilog), classes (e.g., as in SystemVerilog), tasks and/or functions, or other HDL internal constructs, for some use cases. Complexity may be measured in terms of probability of internal refactoring or optimization of the base model that may happen later to refine the base model, and/or probability of an improvement of the base model based on theoretical measures of the base model, to name a few non-limiting examples. Connectivity may be measured by a number of signal external references, task calls or function calls, external parameter definitions, package imports or exports, or the like. This list of elements and sub-elements is non-exhaustive, and is provided for illustrative purposes, not to be construed as limiting.

In 902, during partitioning, a base model may be evaluated for each partition (e.g., as shown in FIG. 1 and described elsewhere herein). A result of the evaluation of the base model may serve as a memory estimate. For example, objective evaluations of various elements of the base model (e.g., quantifying certain constructs, complexity, and/or connectivity, among other possible elements) may be indicative of how much memory or other computing resources or time may be spent in code generation (compilation) per thread or task of a compilation job for a given partition, according to some embodiments.

In 904, the results of the evaluations of 902 may be used as "theoretical" values for memory usages estimates. These theoretical values of memory usages estimates, along with any set of base values, may form initial values as a starting point for determining required computing resources and firing a first set of partitions to be compiled by the required computing resources, between 904 and 906.

In 906, once the first set of partitions has been compiled, "actual" values (measured performance in terms of resources or time, as opposed to corresponding theoretical values) may also be recorded, according to some embodiments.

In 908, any actual, theoretical, and/or base parameters may be provided to a design model. For purposes of the design model, at least one given metric may be analyzed for a difference, correlation, or other relationship between theoretical values and actual values, according to at least one error model (e.g., cubic, linear, other statistical regression or other interpolation technique). Such models may be used for calculating a delta, or other relationship or prediction, between the "theoretical" values and the "actual" values.

For example, a model may be fitted to estimate compilation memory usage for a given partition, such as using the following formula:

$$P_{mem} = f(P_{weight}, P_{complexity}, P_{connectivity}) + \varepsilon, \text{ where}$$

$P_{mem}$=estimated memory usage for compilation of a given partition P $P_{weight}$=Σ(weight of internal constructs, members classes, tasks, functions, etc.)

$P_{complexity}$=Σ(measure of optimizations with each stage of optimization)

$P_{connectivity}$=Σ(measure of cross-module references to/from this module)

Such summations may be performed over each partition member (e.g., classes, constructs, connections, etc.) or account for complexity using probabilistic measures. Epsilon (E) represents error from the base model based on user environment such as the user's design for partition compilation, also referred to as a design-specific model (error model), which may be a cubic model, for some use cases. The error from the base model may be estimated using the design-specific error model created using the delta between the "theoretical" values and the "actual" values for the specific user's design.

For any iteration of operations 906-914 and/or after each partition completes with compilation/code generation, the design model (error model, cubic model, etc., estimating error from the base model) may be dynamically updated along with any variance determined from results of each completed partition compilation, further refining the accuracy of the memory estimates of any remaining partitions. Moreover, for incremental compilations, error models may be recycled from previous incremental compilations, so that previous error models may become new starting error models for subsequent incremental compilations.

In 910, the presence or absence of any remaining partitions may be checked. Assuming that any partitions remain (e.g., because not all partitions have been compiled), execution may pass to 912. Otherwise, if all partitions have been compiled, execution may proceed to 916, in which any report(s) may be generated along with stopping the full compilation process.

In 912, related to the design-model processing noted above with respect to 908, a delta or other relationship, regression, prediction, etc., may be calculated from the design model to determine a subsequent set of partitions (next set), which may be fired in 914.

In 914, upon firing the next set of partitions, execution may again reach 906, at which a corresponding next set of actual values may be recorded. Any additional values may again be provided to the design model, per re-execution (iteration) of 908.

In 916, any report(s) may be generated (e.g., as shown in FIG. 2 and described elsewhere herein). To stop the compilation process, may further include output of any log files including any additional messages, codes, reports, or other copies of information reported or relied on as any intermediate value or representation, for example.

Not all steps of the flowchart shown in FIG. 9 may be needed in all cases to perform the enhanced techniques disclosed herein. Further, some steps may be performed simultaneously, or in a different order from that shown in FIG. 9, as will be understood by a person of ordinary skill in the art.

FIG. 10 is a flowchart illustrating a method 1000 (process) for operation of the enhanced techniques described herein for adaptive scheduling with dynamic partition-load balancing for fast partition compilation, according to some embodiments. Method 1000 may be performed by processing logic that may include hardware (e.g., circuitry, dedicated logic, programmable logic, microcode, etc.), software (e.g., instructions executing on a processing device), or a combination thereof.

Not all steps of method 1000 may be needed in all cases to perform the enhanced techniques disclosed herein. Further, some steps of method 1000 may be performed simultaneously, or in a different order from that shown in FIG. 10, as will be understood by a person of ordinary skill in the art.

Method 1000 shall be described with reference to FIGS. 1-9 and 11-13. However, method 1000 is not limited only to those example embodiments. The steps of method 1000 may be performed by at least one computer processor coupled to at least one memory device. An example processor and memory device(s) are described above with respect to FIG. 13. In some embodiments, method 1000 may be performed by components of systems shown in FIG. 13, which may include at least one processor and memory, such as those of FIG. 13.

In 1002, at least one processor 1302 may be configured (e.g., via program code or instructions stored in/on a non-transitory computer-readable storage medium or device) to detect an available hardware-resource amount to be used by EDA process via multiple computing elements, with respect to a design specification. The design specification may include, for example, a hardware description, design rules, or the like of an integrated circuit design, such as those described elsewhere herein. Detection of available hardware resources may be provided via any of a manifest, log file, configuration file, on-demand poll or probe, detection or discovery protocol, model, infrastructure-as-code system or framework, or equivalent, to name a few non-limiting examples.

In 1004, the at least one processor 1302 may be configured to analyze the design specification, so as to perform operations including generating an estimate of a hardware-resource amount to be used by the EDA process of 1002, for example. Further examples of how the estimated hardware-resource amount may be generated includes evaluation of various elements or sub-elements of a base model and/or a design model as shown in FIG. 9 and described elsewhere herein, according to some embodiments. The estimate may be based on a "theoretical" value derived from the base model. Additionally, or alternatively, the estimate may be derived from empirical data (performance metrics or "actual" value), or from any mix of theoretical calculations or empirical data, for some use cases.

In 1006, the at least one processor 1302 may be configured to compare the estimate with the available hardware-resource amount, for example, corresponding to amount detected in 1002 and the estimate generated in 1004 as described above. In addition to, or instead of, any comparison performed in 1006, a heuristic, regression, prediction, or other model, may be created, updated, or referenced, such as for determining closeness and/or fit with expected values, and/or size of an adjustment to be made in order to match a next expected value. Further examples are discussed with respect to 1008 below.

In 1008, the at least one processor 1302 may be configured to adjust a memory allocation for the EDA process, and/or a specified number of computing elements for parallel use by the EDA process, based at least in part on a result of any of 1002, 1004, and/or 1006 as described above. In order to predict or adjust the parallel processing or memory allocation, at least one artificial intelligence (AI) process, including any machine learning (ML) process, may be configured to adapt and evolve some aspects of adaptive scheduling with dynamic partition-load balancing for fast partition compilation, to respond to increasingly complex scenarios that may not be determinable in advance. Applicable data structures, algorithms, and related processes are described elsewhere herein.

An ML model may be created with the features of different modules or packages being compiled for a given partition. Features for the ML model(s) may be later accumulated over all modules and packages for at least one partition being compiled. Thus, modules may be featurized by counting, sizing, and/or weighting elements such as constructs and connections.

For example, number/size of syntactic blocks, number of cross-module references (XMRs) from/to a given module, iteratively calculated weights for member classes, tasks, functions, etc., with added weight given to XMRs, recalculating weight after each internal optimization of the compiler, and so on. For packages, member classes, functions, tasks, etc., may be weighted differently from those of modules (e.g., equal weight instead of favoring XMRs), but may further provided different scaling for numbers of imports and exports, according to some embodiments. Features may be aggregated at a partition level for each partition compilation.

Following such featurization, features may be collected across internal benchmarks, considering metrics including compile time and memory utilization for each partition compilation. support-vector machines or networks (SVM/SVN) may be created and applied to any other designs as a start point to refine further heuristics, for some use cases.

To demonstrate benefits of method 1000, some problems to be solved are further described below. As a result of performing the operations of method 1000, efficiency and performance of computing machinery may be improved. However, aside from gains in performance, which have been demonstrated to be significant, at least per the empirical examples provided herein, other significant benefits may be realized.

For example, jobs that may otherwise sufficient resources to perform partition compilation for designs that are sufficiently large and/or complex, within specific constraints of time and/or computing resources (number of processors, amount of memory, or both), may be enabled to be completed within tighter constraints. Thus, where resource usage and performance overall may be problematic for designs that may be relatively large and especially complex, the enhanced techniques disclosed herein, including those of FIGS. 9 and 10, may be leveraged to prevent costly delays and stalling of progress and project delivery for larger builds and EDA workflows. This advantage may be even more pronounced especially when faced with constraints of time and/or resources that may otherwise be insurmountable if using only conventional tools without the enhanced techniques described herein.

Figure 11:
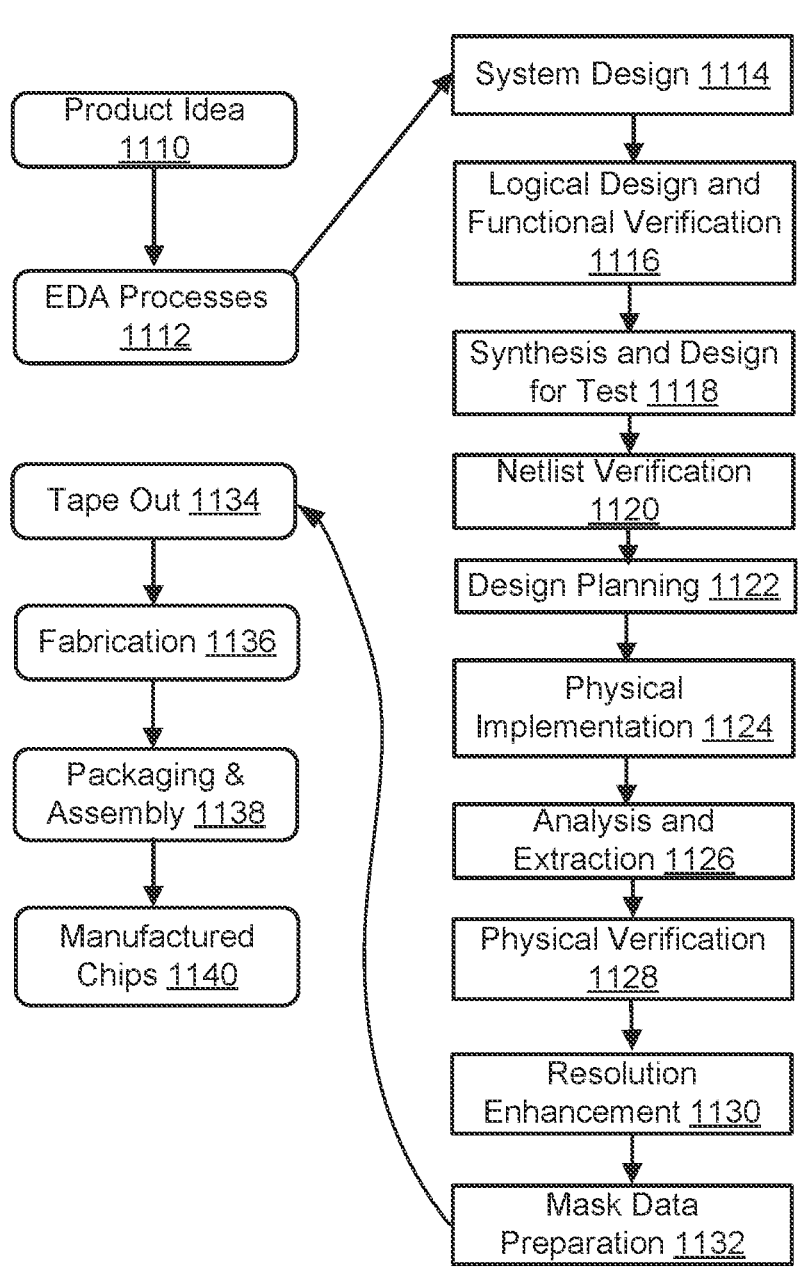
FIG. 11 depicts a flowchart of various processes used during the design and manufacture of an integrated circuit in accordance with some embodiments of the present disclosure.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit design or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 11. The processes described herein may be enabled by EDA products (or tools).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1300 of FIG. 13, or host system 1207 of FIG. 12) may be used to store the programs and data structures that are used by some or all of the EDA products described herein, and products used for development of cells for the library and for physical and logical design that use the library.

Figure 12:
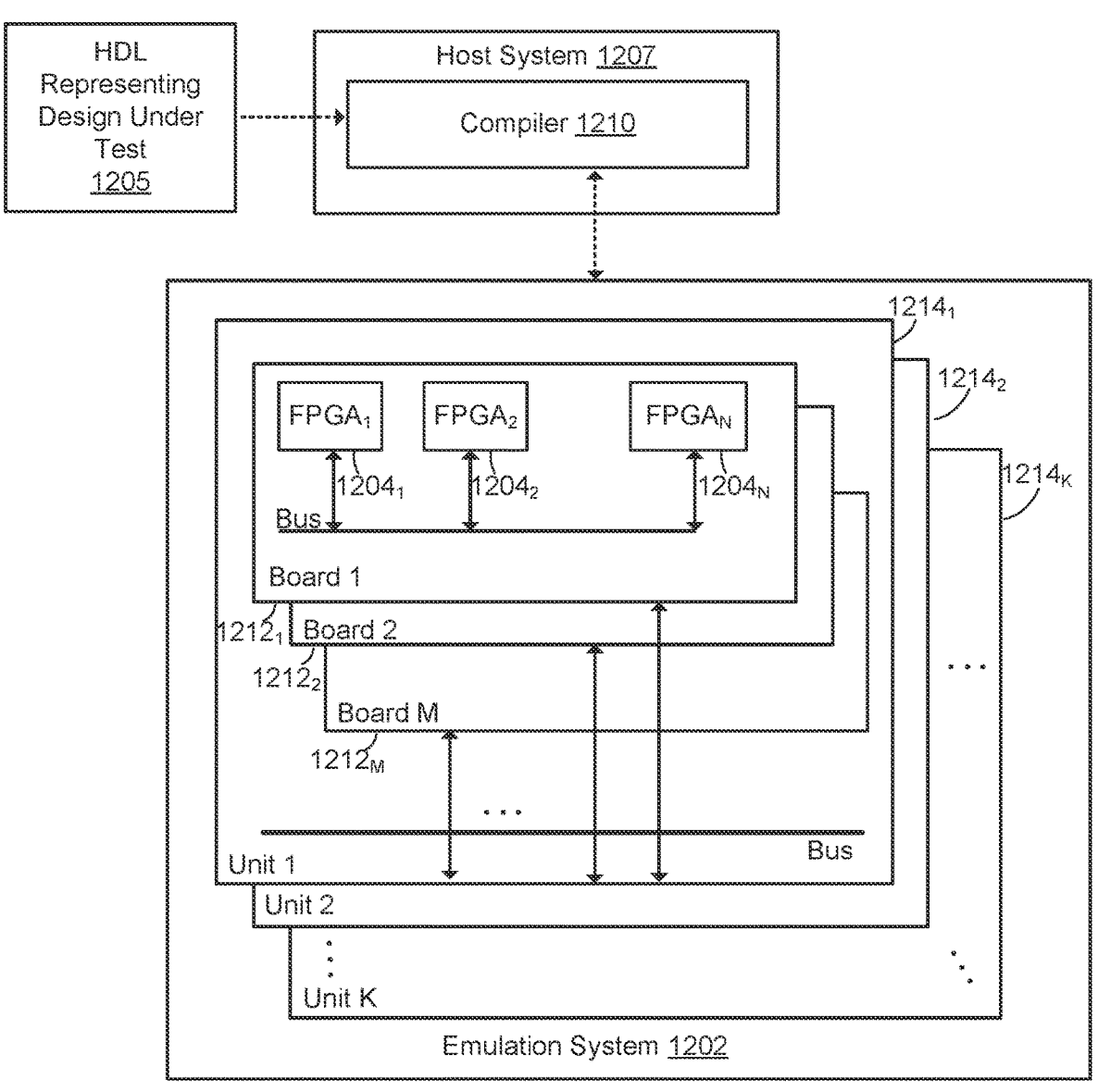
FIG. 12 depicts a diagram of an example emulation system in accordance with some embodiments of the present disclosure.

FIG. 12 depicts a diagram of an example emulation environment 1200. An emulation environment 1200 may be configured to verify the functionality of the circuit design. The emulation environment 1200 may include a host system 1207 (e.g., a computer that is part of an EDA system) and an emulation system 1202 (e.g., a set of programmable devices such as Field Programmable Gate Arrays (FPGAs) or processors). The host system generates data and information by using a compiler 1210 to structure the emulation system to emulate a circuit design. A circuit design to be emulated is also referred to as a Design Under Test ('DUT') where data and information from the emulation are used to verify the functionality of the DUT.

The host system 1207 may include one or more processors. In the embodiment where the host system includes multiple processors, the functions described herein as being performed by the host system can be distributed among the multiple processors. The host system 1207 may include a compiler 1210 to transform specifications written in a description language that represents a DUT and to produce data (e.g., binary data) and information that is used to structure the emulation system 1202 to emulate the DUT. The compiler 1210 can transform, change, restructure, add new functions to, and/or control the timing of the DUT.

The host system 1207 and emulation system 1202 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLU-ETOOTH or IEEE 802.11. The host system 1207 and emulation system 1202 can exchange data and information through a third device such as a network server.

The emulation system 1202 includes multiple FPGAs (or other modules) such as FPGAs 1204₁ and 1204₂ as well as additional FPGAs to 1204_N. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1202 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory.

Depending on the length of the interconnections between different logic blocks, signals can arrive at input terminals of the logic blocks at different times and thus may be temporarily stored in the memory elements/devices.

FPGAs 1204₁-1204_N may be placed onto one or more boards 1212₁ and 1212₂ as well as additional boards through 1212_M. Multiple boards can be placed into an emulation unit 1214₁. The boards within an emulation unit can be connected using the backplane of the emulation unit or any other types of connections. In addition, multiple emulation units (e.g., 1214₁ and 1214₂ through 1214_K) can be connected to each other by cables or any other means to form a multi-emulation unit system.

For a DUT that is to be emulated, the host system 1207 transmits one or more bit files to the emulation system 1202. The bit files may specify a description of the DUT and may further specify partitions of the DUT created by the host system 1207 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1207 receives a description of a DUT that is to be emulated. In some embodiments, the DUT description is in a description language, e.g., a register transfer language (RTL). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA.

The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 1207 and/or the compiler 1210 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 1205 into gate level logic. For a DUT that is to be emulated, the design synthesizer sub-system receives a description of the DUT. If the description of the DUT is fully or partially in HDL (e.g., RTL or other level of abstraction), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 13:
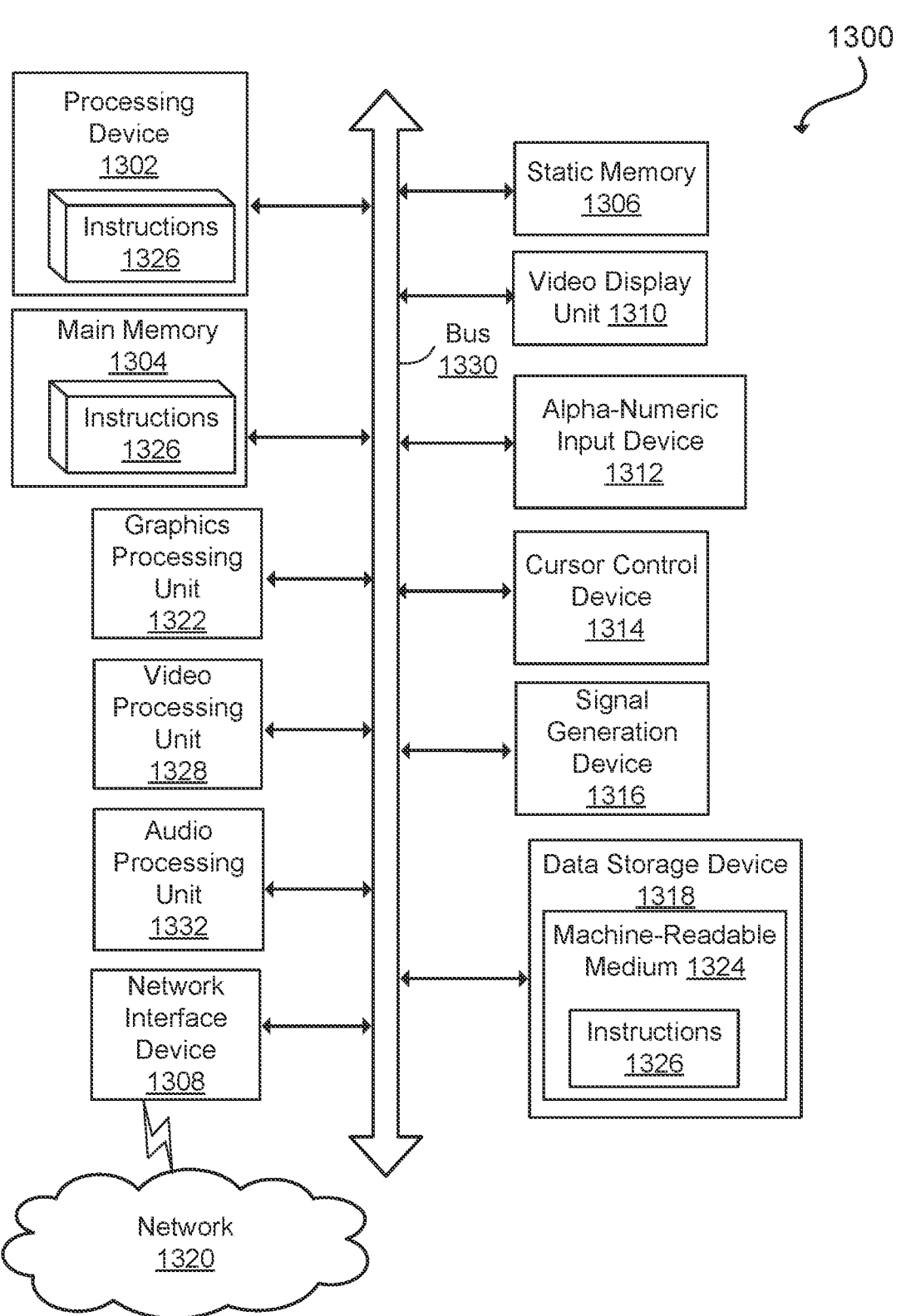
FIG. 13 depicts a diagram of an example computer system in which embodiments of the present disclosure may operate.

FIG. 13 illustrates an example machine of a computer system 1300 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1300 includes a processing device 1302, a main memory 1304 (e.g., read-only memory (ROM), flash memory, dynamic random access memory (DRAM) such as synchronous DRAM (SDRAM), a static memory 1306 (e.g., flash memory, static random access memory (SRAM), etc.), and a data storage device 1318, which communicate with each other via a bus 1330.

Processing device 1302 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. The processing device 1302 may be configured to execute instructions 1326 for performing the operations and steps described herein.

The computer system 1300 may further include a network interface device 1308 to communicate over the network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a graphics processing unit 1322, a signal generation device 1316 (e.g., a speaker), graphics processing unit 1322, video processing unit 1328, and audio processing unit 1332.

The data storage device 1318 may include a machine-readable storage medium 1324 (also known as a non-transitory computer-readable medium) on which is stored one or more sets of instructions 1326 or software embodying any one or more of the methodologies or functions described herein. The instructions 1326 may also reside, completely or at least partially, within the main memory 1304 and/or within the processing device 1302 during execution thereof by the computer system 1300, the main memory 1304 and the processing device 1302 also constituting machine-readable storage media.

In some implementations, the instructions 1326 include instructions to implement functionality corresponding to the present disclosure. While the machine-readable storage medium 1324 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1302 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular, more than one element can be depicted in the figures. Like elements are labeled with like numerals. The disclosure and drawings are, accordingly, to be regarded in an illustrative sense rather than a restrictive sense.

What is claimed is:

1. A method comprising:

compiling, by an electronic design automation (EDA) process via a plurality of computing elements, at least one partition of a plurality of partitions of a design specification of an integrated circuit, each partition of the plurality of partitions comprising one or more circuit blocks;

training a machine learning model based on a plurality of features of the at least one partition of the plurality of partitions and an actual hardware-resource amount to compile the at least one partition of the plurality of partitions of the design specification of the integrated circuit, the machine learning model being trained during compilation of the design specification of the integrated circuit to compute an estimated hardware resource amount to compile a given partition of the plurality of partitions of the design specification of the integrated circuit based on a plurality of features of the given partition;

determining, by at least one processor, an estimate of a hardware-resource amount to be used by the EDA process to compile remaining partitions of the plurality of partitions of the design specification of the integrated circuit, comprising supplying a plurality of features of a partition of the remaining partitions to the machine learning model, the partition of the remaining partitions being different from the at least one partition of the plurality of partitions used in training the machine learning model, the plurality of features comprising a number of syntactic blocks specifying the one or more circuit blocks of the partition of the remaining partitions;

determining the estimate of the hardware-resource amount is within an available hardware resource amount among the plurality of computing elements, wherein the available hardware resource amount of computing elements are available for parallel use by the EDA process; and compiling the remaining partitions of the design specification of the integrated circuit by a specified number of computing elements, the specified number of computing elements being computed by the at least one processor to match the estimate of the hardware-resource amount to be used by the EDA process to compile the remaining partitions of the plurality of partitions, the specified number being computed based at least in part on a number of the remaining partitions.

2. The method of claim 1, further comprising:

calculating, by the at least one processor, a weighted load average for the plurality of computing elements.

3. The method of claim 2, wherein the specified number of computing elements is computed based on reducing the specified number of computing elements in response to an increase in the weighted load average.

4. The method of claim 1, wherein the specified number of computing elements is computed based on increasing the specified number of computing elements in response to a time estimation during the EDA process.

5. The method of claim 1, further comprising:
adjusting, by the at least one processor, a memory allocation for the EDA process.

6. The method of claim 1, further comprising:
determining, by the at least one processor, a job to be performed by the EDA process with respect to the design specification, wherein the job is further determined to have a higher proportional value of the estimate of a hardware-resource amount to be used by the EDA process, with respect to the other jobs of the EDA process; and
prioritizing, by the at least one processor, the job ahead of the other jobs.

7. The method of claim 1, further comprising:
determining, by the at least one processor, a job to be performed by the EDA process with respect to the design specification, wherein the job is further determined to have a lower proportional value of the estimate of a hardware-resource amount to be used by the EDA process, with respect to other jobs of the EDA process; and
executing, by the at least one processor, the job in an absence of other prioritized jobs.

8. A system comprising:
a memory; and
at least one processor coupled to the memory and configured to perform operations comprising:
compiling, by an electronic design automation (EDA) process via a plurality of computing elements, at least one partition of a plurality of partitions of a design specification of an integrated circuit, each partition of the plurality of partitions comprising one or more circuit blocks;
training a machine learning model during compilation of the design specification of the integrated circuit to compute an estimated hardware-resource amount based on a plurality of features of the at least one partition of the plurality of partitions and an actual hardware-resource amount to compile the at least one partition of the plurality of partitions of the design specification of the integrated circuit;
determining an estimate of a hardware-resource amount to be used by the EDA process to compile remaining partitions of the plurality of partitions comprising supplying a plurality of features of a partition of the remaining partitions of the design specification of the integrated circuit to the machine learning model, the partition of the remaining partitions being different from the at least one partition of the plurality of partitions used in training the machine learning model, the plurality of features comprising a number of syntactic blocks specifying the one or more circuit blocks of the partition of the remaining partitions;
determining the estimate of the hardware-resource amount is within an available hardware resource amount among the plurality of computing elements, wherein the available hardware resource amount of computing elements are available for parallel use by the EDA process; and compiling the remaining partitions of the design specification of the integrated circuit by a specified number of computing elements, the specified number of computing elements being computed to match the estimate of the hardware-resource amount to be used by the EDA process to compile the remaining partitions of the plurality of partitions, the specified number being computed based at least in part on a number of the remaining partitions.

9. The system of claim 8, wherein the operations further comprise:
calculating a weighted load average for the plurality of computing elements.

10. The system of claim 9, wherein the specified number of computing elements is computed based on reducing the specified number of computing elements in response to an increase in the weighted load average.

11. The system of claim 8, wherein the specified number of computing elements is computed based on increasing the specified number of computing elements in response to a time estimation during the EDA process.

12. The system of claim 8, wherein the operations further comprise:
adjusting a memory allocation for the EDA process.

13. The system of claim 8, wherein the operations further comprise:
determining a job to be performed by the EDA process with respect to the design specification, wherein the job is further determined to have a higher potential value of the estimate of a hardware-resource amount to be used by the EDA process, with respect to other jobs of the EDA process; and
prioritizing the job ahead of the other jobs.

14. The system of claim 8, wherein the operations further comprise:
determining a job to be performed by the EDA process with respect to the design specification, wherein the job is further determined to have a lower proportional value of the estimate of a hardware-resource amount to be used by the EDA process, with respect to other jobs of the EDA process; and
executing the job in an absence of other prioritized jobs.

15. A non-transitory computer-readable storage medium storing instructions that, when executed by at least one processor, cause the at least one processor to perform operations comprising:
compiling, by an electronic design automation (EDA) process via a plurality of computing elements having a first memory allocation, at least one partition of a plurality of partitions of a design specification of an integrated circuit, each partition of the plurality of partitions comprising one or more circuit blocks;
training a machine learning model during compilation of the design specification of the integrated circuit to compute an estimated hardware-resource amount based on a plurality of features of the at least one partition of the plurality of partitions and an actual hardware-resource amount to compile the at least one partition of the plurality of partitions of the design specification of the integrated circuit;
determining an estimate of a hardware-resource amount to be used by the EDA process to compile remaining partitions of the plurality of partitions, comprising supplying a plurality of features of a partition of the remaining partitions of the design specification of the integrated circuit to the machine learning model, the partition of the remaining partitions being different from the at least one partition of the plurality of partitions used in training the machine learning model, the plurality of features comprising a number of syntactic blocks specifying the one or more circuit blocks of the partition of the remaining partitions;

determining the estimate of the hardware-resource amount is within an available hardware resource amount among the plurality of computing elements, wherein the available hardware resource amount of computing elements are available for parallel use by the EDA process; and compiling the remaining partitions of the design specification of the integrated circuit by the EDA process via a specified number of computing elements of the plurality of computing elements having a second memory allocation, the specified number of computing elements or the second memory allocation being computed to match the estimate of the hardware-resource amount to be used by the EDA process to compile the remaining partitions of the plurality of partitions, the specified number of computing elements or the second memory allocation being computed based at least in part on a number of the remaining partitions.

16. The non-transitory computer-readable storage medium of claim 15, wherein the operations further comprise:

calculating a weighted load average for the plurality of computing elements.

17. The non-transitory computer-readable storage medium of claim 16, wherein the specified number of computing elements is computed by reducing a number of computing elements allocated to the EDA process in response to an increase in the weighted load average.

18. The non-transitory computer-readable storage medium of claim 15, wherein the specified number of computing elements is computed by increasing a number of computing elements allocated to the EDA process in response to a time estimation during the EDA process.

19. The non-transitory computer-readable storage medium of claim 15, wherein the operations further comprise:

determining a job to be performed by the EDA process with respect to the design specification, wherein the job is further determined to have a higher proportional value of the estimate of a hardware-resource amount to be used by the EDA process, with respect to other jobs of the EDA process; and prioritizing the job ahead of the other jobs.

20. The non-transitory computer-readable storage medium of claim 15, wherein the operations further comprise:

determining a job to be performed by the EDA process with respect to the design specification, wherein the job is further determined to have a lower proportional value of the estimate of a hardware-resource amount to be used by the EDA process, with respect to other jobs of the EDA process; and executing the job in an absence of other prioritized jobs.

* * * * *